(12) United States Patent
Duan et al.

(10) Patent No.: US 6,998,462 B2
(45) Date of Patent: Feb. 14, 2006

(54) POLYESTER PROCESS

(75) Inventors: Jiwen F. Duan, Cary, NC (US); Donald E. Putzig, Newark, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 98 days.

(21) Appl. No.: 10/459,244

(22) Filed: Jun. 11, 2003

(65) Prior Publication Data
US 2004/0254330 A1 Dec. 16, 2004

(51) Int. Cl.
*C08G 63/82* (2006.01)

(52) U.S. Cl. ............... 528/279; 528/274; 528/277; 528/280; 528/282; 528/285; 528/286; 528/287; 528/290; 528/295; 528/300; 528/301; 528/302; 528/308; 528/308.6; 525/437; 525/444; 524/706; 524/711; 524/730; 524/765; 524/766; 524/783; 524/785; 524/786; 524/789

(58) Field of Classification Search ............... 528/274, 528/277, 279, 280, 282, 285, 286, 287, 290, 528/295, 300, 301, 302, 308, 308.6; 525/437; 525/444; 524/706, 711, 730, 765, 766, 783, 524/785, 786, 789
See application file for complete search history.

(56) References Cited

U.S. PATENT DOCUMENTS 6,787,630 B1 * 9/2004 Dominguez De Walter et al. .......... 528/279

FOREIGN PATENT DOCUMENTS

WO    WO 02068497    9/2002

\* cited by examiner

*Primary Examiner*—Samuel A. Acquah

(57) ABSTRACT

Disclosed is a process that comprises contacting, in the presence of an esterification or transesterification or polycondensation catalyst composition, a toner, and a phosphorus compound, a carbonyl compound and an alcohol under a condition suitable for esterification, transesterification, or polymerization.

20 Claims, No Drawings

POLYESTER PROCESS

FIELD OF THE INVENTION

This invention relates to a composition that comprises or is produced from a titanium compound and a phosphorus compound and to a process for esterification, transesterification, or polymerization of a carbonyl compound in the presence of a catalyst composition and a phosphorus compound.

BACKGROUND OF THE INVENTION

Polyesters such as, for example, polyethylene terephthalate, polytrimethylene terephthalate and polybutylene terephthalate, generally referred to as "polyalkylene terephthalates", are a class of important industrial polymers. They are widely used in fibers, films, and molding applications.

Polyesters can be produced by transesterification of an ester such as dimethyl terephthalate (DMT) with a glycol followed by polycondensation or by direct esterification of an acid such as terephthalic acid (TPA) with a glycol followed by polycondensation. A catalyst is used to catalyze the esterification, transesterification and/or polycondensation.

For example, polyester can be produced by injecting a slurry mixture of TPA and glycol at about 80° C. into an esterifier. Linear oligomer with degree of polymerization less than 10 are formed in one or two esterifiers at temperatures from 240° C. to 290° C. The oligomer is then polymerized in one or two prepolymerizers and then a final polymerizer or finisher at temperatures from 250° C. to 300° C. TPA esterification is catalyzed by the carboxyl groups of the acid.

Antimony is often used for polymerization or polycondensation reaction. However, antimony forms insoluble antimony complexes that plug fiber spinnerets and leads in fiber spinning to frequent shutdowns to wipe spinnerets clean of precipitated antimony compounds. The antimony-based catalysts are also coming under increased environmental pressure and regulatory control, especially in food contact applications.

Titanium catalysts can be used in the esterification, transesterification, and polycondensation reactions. However, the titanium catalysts tend to hydrolyze on contact with water forming glycol-insoluble oligomeric species, which lose catalytic activity. Polyesters produced from an organic titanate also generate yellow discoloration. Even water compatible titanates, such as titanium bis-ammonium lactate, bis-triethanolamine titanate or the titanium sodium citrate catalysts disclosed in EP 812818, when used as polyesterification catalysts, generate significant yellow discoloration in the resultant polymer. Similarly, WO 99/28033 discloses an organometallic compound for producing an ester. The organometallic compound comprises the reaction product of an orthoester of titanium, zirconium, or aluminum, an alcohol containing at least two hydroxyl groups, an organophosphorus compound, and a base. When used as polyesterification catalyst, however, it was found that the organometallic compound also generates undesirably significant yellow discoloration in the final product.

Therefore, there is an increasing need for developing a new catalyst that is efficient, produces a polymer with reduced color, exhibits good catalytic activity, does not result in plugging fiber spinnerets, and is environmentally friendly.

An advantage of the present invention is the polymer produced using the invention catalyst has improved optical properties (e.g., less undesirable color) compared to polymer produced using an organic titanate catalyst alone. Other advantages will become more apparent as the invention is more fully disclosed herein below.

SUMMARY OF THE INVENTION

A composition that can be used for producing polyester is provided, which comprises a titanium compound and a phosphorus compound.

Also provided is a process that can be used for producing polyester, which comprises contacting, in the presence of a catalyst composition and a phosphorus compound, a carbonyl compound and an alcohol in which the composition comprises a titanium compound.

Further provided is a process that can be used to produce a polymer containing reduced insoluble particles or solids, which comprises contacting, in the presence of a catalyst composition and a phosphorus compound in which the catalyst comprises a metal and the phosphorus compound is not phosphoric acid.

DETAILED DESCRIPTION OF THE INVENTION

The term "reduced insoluble particles" or "reduced solids" refers to the quantity of insoluble particles or solids present in a polymer such as polyester produced by the invention process as compared to that produced by a conventional process in which phosphoric acid is present in the conventional process.

According to an embodiment of the invention, the invention composition can comprise, consist essentially of, or consists of, or is produced by combining (A) a titanium compound; (B) either (i) a complexing agent and optionally a first solvent or (ii) a combination of a complexing agent, hypophosphorous acid or a salt thereof, and optionally a first solvent, a zirconium compound, or both, or (iii) combinations of (i) and (ii); and (C) a phosphorus compound; and optionally a second solvent.

According to the invention, the preferred titanium compounds used in component (A) are organic titanium compounds such as, for example, titanium tetrahydrocarbyloxides, also referred to as tetraalkyl titanates herein for they are readily available and effective. Examples of suitable titanium tetrahydrocarbyloxides include those having the formula of $Ti(OR)_4$ where each R is individually selected from an alkyl, cycloalkyl, alkaryl, hydrocarbyl radical containing from 1 to about 30, preferably 2 to about 18, and most preferably 2 to 12 carbon atoms per radical and each R can be the same or different. Titanium tetrahydrocarbyloxides in which the hydrocarboxyl group contains from 2 to about 12 carbon atoms per radical which is a linear or branched alkyl radical are most preferred because they are relatively inexpensive, more readily available, and effective in forming the solution. Suitable titanium tetrahydrocarbyloxides include, but are not limited to, titanium tetraethoxide, titanium tetrapropoxide, titanium tetraisopropoxide, titanium tetra-n-butoxide, titanium tetrahexoxide, titanium tetra 2-ethylhexoxide, titanium tetraoctoxide, and combinations of two or more thereof. The titanium tetrahydrocarbyloxides are well known to one skilled in the art. See, for example, U.S. Pat. Nos. 6,066,714 and 6,166,170, the description of which is incorporated herein by reference. Examples of commercially available organic titanium compounds include, but are not limited to, TYZOR® TPT and TYZOR® TBT (tetra isopropyl titanate and tetra n-butyl titanate, respectively) available from E. I. du Pont de Nemours and Company, Wilmington, Del., U.S.A.

According to the invention, the titanium tetrahydrocarbyloxide can also be combined with a zirconium compound to produce a mixture comprising a titanium tetrahydrocarbyloxide and a zirconium tetrahydrocarbyloxide. The presently preferred zirconium tetrahydrocarbyloxides include, but are not limited to, zirconium tetraethoxide, zirconium tetrapropoxide, zirconium tetraisopropoxide, zirconium tetra-n-butoxide, zirconium tetrahexoxide, zirconium tetra 2-ethylhexoxide, zirconium tetraoctoxide, and combinations of two or more thereof. The molar ratio of Ti/Zr can be in the range of from about 0.001:1 to about 10:1.

The complexing agent suitable for use in (B)(i) and (B)(ii) can be a hydroxycarboxylic acid, an alkanolamine, an aminocarboxylic acid, or combinations of two or more thereof. It is presently preferred that it be an α-hydroxycarboxylic acid, an alkanolamine, or an α-aminocarboxylic acid in which the hydrocarbyl group or alkyl group has 1 to about 15, preferably 1 to 10 carbon atoms per group, and combinations of two or more thereof. Examples of suitable complexing agents include, but are not limited to, lactic acid, glycolic acid, citric acid, tartaric acid, malic acid, diethanolamine, triethanolamine, tetrahydroxyisopropylethylenediamine, glycine, bis-hydroxyethyl glycine, hydroxyethyl glycine, and combinations of two or more thereof.

For example, TYZOR® LA is a reaction product produced from a titanium compound and lactic acid, a complexing agent. It is an aqueous solution of titanium bis-ammonium lactate produced by adding two moles of lactic acid to TYZOR® TPT (tetraisopropyl titanate) followed by addition of water, removal of by-product isopropyl alcohol and neutralization with 28% aqueous ammonium hydroxide solution.

According to the invention, component (B)(ii) can also comprise a hypophosphorous acid or salt thereof having the formula of $H_2P(O)OM$ in which M is hydrogen, ammonium ion, a metal ion, or combinations of two or more thereof and the phosphorus atom is bonded to two hydrogen atom. The metal ion can be any metal ion. It is presently preferred that the metal ion be an alkali metal ion. The hypophosphorous acid or its metal salt is commercially available as an aqueous solution and it is generally used herein as an aqueous solution.

According to the invention, the molar ratio of the complexing agent to titanium compound, can be in the range of from about 1:1 to about 10:1, preferably about 1:1 to about 7:1, and most preferably 1:1 to 4:1. The molar ratio of hypophosphorous acid or its salt to titanium compound (P:Ti) can be any ratio that, when the composition is used as catalyst to produce polyester, can reduce the yellowness of the polyester. The preferred ratio can be in the range of from about 0.1:1 to about 10:1, preferably about 0.5:1 to about 7:1, and most preferably 1:1 to 4:1. A solvent can be present in the composition to produce a soluble or substantially soluble composition.

The preferred first solvent can be water or an alcohol having 1 to about 10, preferably 1 to about 8, and most preferably 1 to 5 carbon atoms per molecule such as, for example, an alkylene glycol, a polyalkylene glycol, alkoxylated alcohol, or combinations thereof. Examples of suitable solvents include, but are not limited to, ethanol, propanol, isopropanol, butanol, ethylene glycol, propylene glycol, isopropylene glycol, butylene glycol, 1-methyl propylene glycol, pentylene glycol, diethylene glycol, triethylene glycol, diethylene glycol monomethyl ether, triethylene glycol monomethylether, 2-ethyl hexanol, and combinations of two or more thereof. The preferred second solvent can be the same as the first solvent.

A composition obtained from a titanium compound, a complexing agent, and hypophosphorous acid or salt thereof can be produced by any means known to one skilled in the art such as that disclosed in U.S. Pat. No. 6,166,170, disclosed above.

For component (C), a phosphorus compound that can be used with a titanium-containing catalyst to produce polyester having low yellowness, as compared to a polyester produced from a catalyst without such phosphorus compound can be used. Examples of suitable phosphorus compounds include, but are not limited to, a polyphosphoric acid or a salt thereof, a phosphonate ester, a pyrophosphoric acid or salt thereof, a pyrophosphorous acid or salt thereof, and combinations of two or more thereof. The polyphosphoric acid can have the formula of $H_{n+2}P_nO_{3n+1}$ in which n is $\geq 2$. The phosphonate ester can have the formula of $(R^1O)_2P(O)ZCO_2R^1$ in which each $R^1$ can be the same or different and can be independently H, $C_{1-4}$ alkyl, or combinations thereof; and Z is $C_{1-5}$ alkylene, $C_{1-5}$ alkylidene, or combinations thereof, di(polyoxyethylene) hydroxymethyl phosphonate, and combinations of two or more thereof. The salt can be an alkali metal salt, alkaline earth metal salt, ammonium salt, or combinations of two or more thereof.

Illustrative examples of suitable phosphorus compounds include, but are not limited to, potassium tripolyphosphate, sodium tripolyphosphate, potassium tetra phosphate, sodium pentapolyphosphate, sodium hexapolyphosphate, potassium pyrophosphate, potassium pyrophosphite, sodium pyrophosphate, sodium pyrophosphate decahydrate, sodium pyrophosphite, ethyl phosphonate, propyl phosphonate, hydroxymethyl phosphonate, di(polyoxyethylene) hydroxymethyl phosphonate, methylphosphonoacetate, ethyl methylphosphonoacetate, methyl ethylphosphonoacetate, ethyl ethylphosphonoacetate, propyl dimethylphosphonoacetate, methyl diethylphosphonoacetate, triethyl phosphonoacetate, or combinations of two or more thereof. The presently preferred phosphorus compound is tripolyphosphate.

The composition can contain titanium in the range of from about 0.0001% to about 10%, preferably 0.01% to 10%, and most preferably 0.1% to 8% by weight. The composition can contain phosphorous, derived from component (C), such that the P/Ti molar ratio is in the range of about 0.001:1 to about 20:1, preferably about 0.01:1 to about 10:1, and most preferably 0.1:1 to 1:1. Water and a solvent such as a glycol, if present, can make up the rest of the composition.

The invention composition is substantially soluble in a second solvent disclosed above. The term "substantially" means more than trivial. It is preferred that the composition be completely soluble in the solvent. However, a substantial portion of the composition can also be suspended or dispersed in the solvent.

The composition can be produced by any means known to one skilled in the art such as those disclosed in U.S. Pat. No. 6,066,714 and U.S. Pat. No. 6,166,170 discussed above and description of which is omitted herein for the interest of brevity.

According to another embodiment of the invention, an esterification, transesterification, or polymerization process can comprise contacting, in the presence of a catalyst composition and a phosphorus compound, a carbonyl compound and an alcohol under a condition sufficient to effect the production of a polymer.

The catalyst composition can be a cobalt, antimony, manganese, or zinc catalyst commonly employed in the manufacture of polyester, description of which is omitted herein because such catalyst is well-known to one skilled in the art. The catalyst composition also can comprise a titanium complex and a phosphorus compound.

The titanium complex can be either a composition comprising, consist essentially of, or consists of, or is produced by combining (A) a titanium compound and (B) either (i) a complexing agent and optionally a first solvent or (ii) a combination of a complexing agent, hypophosphorous acid or a salt thereof, and optionally a first solvent, a zirconium compound, or both, (iii) a combination of a solubility promoter, a phosphorus source, and optionally a first solvent, (iv) a combination of a glycol and optionally a phosphorus compound and water, or (v) combinations of any two of (i), (ii), (iii), and (iv).

The phosphorus compound is the same as that disclosed above in composition component (C), which is incorporated herein.

The definition, scope, and quantity of each of components (A), (B)(i), (B)(ii), and (B)(iv) of the titanium complex are the same as those disclosed above and the descriptions are incorporated herein.

The solubility promoter can be an ortho silicate, ortho zirconate, or combinations thereof. The preferred solubility promoter in (B)(iii) can be an organic silicate, organic zirconate, or combinations thereof. The most preferred solubility promoter can facilitate the dissolution of essentially all titanium present in the composition in a solvent used to prepare the composition, at room temperature (about 25° C.). Such solubility promoters include, but are not limited to, organic ortho silicates, organic ortho zirconates, or combinations thereof. The organic ortho silicates have the formula of $Si(OR)_4$ and the organic ortho zirconates have the formula of $Zr(OR)_4$ in which each R is the same as that disclosed above. These solubility promoters are generally commercially available or can be produced by, for example, introducing a silicon tetrachloride or zirconium tetrachloride into a solvent to replace the chlorides with the R groups in the solvent. Examples of suitable solubility promoters include, but are not limited to, tetraethyl ortho silicate, tetra-n-propyl ortho silicate, tetra n-propyl ortho zirconate, tetra n-butyl ortho zirconate, and combinations of two or more thereof. Tetraethyl ortho silicate and tetra-n-propyl ortho silicate are commercially available. Tetra n-propyl ortho zirconate and tetra n-butyl ortho zirconate are organic zirconates commercially available from E. I. du Pont de Nemours and Company under the "TYZOR®" trademark.

The phosphorus source can be a phosphonic acid, a phosphinic acid, a phosphine, or combinations of two or more thereof. It is preferred that the phosphorus source in (B)(iii) be selected from a phosphonic acid, a phosphinic acid, a phosphine, or combinations thereof, each of which can have an alkyl, alkenyl, alkaryl, aralkyl, or aryl group directly bonded to the phosphorus atom. Each group can contain 1 to about 25, preferably 1 to about 20, and most preferably 1 to 15 carbon atoms per group such as methyl group, ethyl group, a phenyl group, or naphthyl group. Furthermore, the hydroxy group of the acid can also be substituted. For example, one or two OH groups bonded to the phosphorus atom of a phosphonic acid can be esterified.

Examples of suitable phosphorus sources include, but are not limited to, phenyl phosphinic acid, diphenyl phosphinic acid and 3-(hydroxyphenylphosphinyl)propanoic acid, 1,2-bis-diphenylphosphinoethane, 1,3-bis-diphenylphosphinopropane, 1,4-bis-diphenylphosphinobutane, bis-4-tolylphosphine oxide, bis-3,5-xylylphosphine oxide, or combinations of two or more thereof.

Component (B)(iii) can further comprise a sulfonic acid or salt thereof can optionally be used in the invention. The preferred sulfonic acids can be any aryl or alkyl sulfonic acid that can be substantially soluble in a solvent disclosed above. Examples of suitable sulfonic acids include, but are not limited to, p-toluene sulfonic acid, benzene sulfonic acid, methane sulfonic acid, ethane sulfonic acid, propane sulfonic acid, butane sulfonic acid, and combinations of two or more thereof. The salt of sulfonic acid can be an alkali metal salt, an alkaline earth metal salt, an ammonium salt, or combinations of two or more thereof.

For component (B)(iv), the glycol can include, but are not limited to, ethylene glycol, propylene glycol, isopropylene glycol, butylene glycol, 1-methyl propylene glycol, pentylene glycol, diethylene glycol, triethylene glycol, and combinations of two or more thereof. The presently preferred glycol is ethylene glycol.

The phosphorus compound for component (B)(iv) can be the same as that disclosed above for composition component (C). The titanium compound, glycol, and optional phosphorus compound ((B)(iv)) and water can be combined, by any means known to one skilled in the art, under a suitable condition effective to the production of the composition or a reaction product. The condition can include a temperature in the range of from about 0° C. to about 200° C., preferably about 50° C. to about 120° C., and most preferably 50° C. to 80° C., under a pressure that can accommodate the temperature range, and for a period of time sufficient to produce the composition or the reaction product. One of the main reaction products is probably titanium glycolate, which can be complexed with the phosphorus compound. For example, the solution of tetraisopropyl titanate/glycol/potassium tripolyphosphate can be heated between 40° C. and 200° C., preferably between 60° C. and 120° C., to remove and condense isopropyl alcohol. Based on the total weight of the composition equaling 100%, the titanium complex comprising (B)(iv) can comprise about 0.0001% to about 20%, preferably about 0.001% to about 10% titanium; about 30% to about 99.999%, preferably about 50% to about 99.999% of the composition is derived from a glycol; and about 0.01% to about 50% water. The molar ratio of phosphorus to titanium, if a phosphorous is present in the composition, can be in the range of from about 0.001:1 to about 20:1, preferably about 0.01:1 to about 10:1.

The catalyst composition can further comprise a cocatalyst. Examples of cocatalysts include, but are not limited to, cobalt/aluminum catalysts, antimony compounds, and combinations thereof. The cobalt/aluminum catalyst comprises a cobalt salt and an aluminum compound in which the mole ratio of aluminum to cobalt is in the range of from 0.25:1 to 16:1. The cobalt/aluminum catalyst is disclosed in the U.S. Pat. No. 5,674,801, disclosure of which is incorporated herein by reference.

A preferred antimony compound can be any antimony compound that is substantially soluble in a solvent disclosed above. Examples of suitable antimony compounds include, but are not limited to, antimony oxides, antimony acetate, antimony hydroxides, antimony halides, antimony sulfides, antimony carboxylates, antimony ethers, antimony glycolates, antimony alcoholates, antimony nitrates, antimony sulfates, antimony phosphates, and combinations of two or more thereof.

According to the invention, any carbonyl compound, which when combined with an alcohol, can produce an ester or polyester can be used. Such carbonyl compounds include, but are not limited to, acids, esters, amides, acid anhydrides, acid halides, salts of carboxylic acid oligomers or polymers having repeat units derived from an acid, or combinations of two or more thereof. The presently preferred acid is an organic acid such as a carboxylic acid or salt thereof.

A preferred process for producing an ester or polyester comprises, consists essentially of, or consists of contacting a reaction medium with the catalyst composition disclosed above. The reaction medium can comprise, consist essentially of, or consist of an alcohol and either (1) an organic acid, a salt thereof, an ester thereof, or combinations thereof or (2) an oligomer having repeat units derived from an organic acid or ester.

The organic acid or ester thereof can have the formula of $R^2COOR^2$ in which each $R^2$ independently can be (1) hydrogen, (2) hydrocarboxyl radical having a carboxylic acid group at the terminus, or (3) hydrocarbyl radical in which each radical has 1 to about 30, preferably about 3 to about 15 carbon atoms per radical which can be alkyl, alkenyl, aryl, alkaryl, aralkyl radical, or combinations of two or more thereof. The presently preferred organic acid or ester thereof has the formula of $R^2O_2CACO_2R^2$ in which A is an alkylene group, an arylene group, alkenylene group, or combinations of two or more thereof and $R^2$ is the same as above. Each A has about 2 to about 30, preferably about 3 to about 25, more preferably about 4 to about 20, and most preferably 4 to 15 carbon atoms per group. Examples of suitable organic acids include, but are not limited to, terephthalic acid, isophthalic acid, napthalic acid, succinic acid, adipic acid, phthalic acid, glutaric acid, acrylic acid, oxalic acid, benzoic acid, maleic acid, propenoic acid, and combinations of two or more thereof. The presently preferred organic diacid is terephthalic acid because the polyesters produced therefrom have a wide range of industrial applications. Examples of suitable esters include, but are not limited to, dimethyl adipate, dimethyl phthalate, dimethyl terephthalate, methyl benzoate, dimethyl glutarate, and combinations of two or more thereof.

Any alcohol that can esterify an acid to produce an ester or polyester can be used in the present invention. Examples of suitable alcohols include alkylene glycols and polyalcohols. Examples of polyalcohols include, but are not limited to, polyethylene glycol, polypropylene glycol, poly(tetramethylene glycol), tertiary-1,4-butenediol polybutylene, and combinations of two or more thereof. An alkylene glycol can have the formula of $(HO)_nA(OH)_n$ in which A and n are the same as those disclosed above. Examples of suitable alkylene glycols include, but are not limited to, ethanol, propanol, isopropanol, butanol, ethylene glycol, propylene glycol, isopropylene glycol, butylene glycol, 1-methyl propylene glycol, tertiary-1,4-butenediol, pentylene glycol, diethylene glycol, triethylene glycol, 2-ethyl hexanol, and combinations of two or more thereof. These alcohols are commercially available. For example, poly(tetramethylene glycol) can be obtained from E.I. du Pont de Nemours & Company, Wilmington, Del., USA).

The oligomer of a carbonyl compound such as TPA and alcohol generally has a total of about 2 to about 100, preferably from about 2 to about 20 repeat units derived from the carbonyl compound and alcohol.

The contacting of the carbonyl compound and alcohol in the presence of the catalyst can be carried out by any suitable means.

Any suitable condition to effect the production of an ester or polyester can include a temperature in the range of from about 150° C. to about 500° C., preferably about 200° C. to about 400° C., and most preferably 250° C. to 300° C. under a pressure in the range of from about 0.001 to about 1 atmosphere for a time period of from about 0.2 to about 20, preferably about 0.3 to about 15, and most preferably 0.5 to 10 hours.

The molar ratio of the alcohol to carbonyl compound can be any ratio so long as the ratio can effect the production of an ester or polyester. Generally the ratio can be in the range of from about 1:1 to about 10:1, preferably about 1:1 to about 5:1, and most preferably 1:1 to 4:1.

The catalyst, expressed as element Co, Sb, Mn, Zn, or Ti, can be present in the range of about 0.001 to about 30,000 ppm of the medium comprising the carbonyl compound and alcohol, preferably about 0.1 to about 1,000 ppm, and most preferably 1 to 100 ppm by weight. A cocatalyst, if present, can be in the range of from about 0.01 to about 1,000 ppm of the reaction medium.

The invention process can also be carried out using any of the conventional melt or solid state techniques and in the presence or absence of a toner compound to reduce the color of polyester produced. Examples of toner compounds include, but are not limit to, cobalt aluminate; cobalt acetate; anthranquinones; anthrapyridones; Carbazole violet (CI pigment violet 23; diindolo[2,3-c:2'3'-n]triphenodioxazine, 9,19-dichloro-5,15-diethyl-5,15-dihydro-; commercially available from Hoechst-Celanese, Coventry, R.I., or Sun Chemical Corp, Cincinnati, Ohio); Estofil Blue S-RLS®, Polysynthren Blue RLS, (Solvent Blue 45), Polysynthren Blue R™ (C.I. Solvent Blue 122, acetamide,N-[4-[(9,10-dihydro-4-hydroxy-9,10-dioxo-1-anthracenyl)amino]phenyl]); Polysynthren Red GFP (C.I. Solvent Red 135; 12H-phthaloperin-12-one, 8,9,10,11-tetrachloro), Polysynthren Red BB (Solvent Red 195; 2-Thiophenecarboxylic acid, 4-cyano-5-((5-cyano-2,6-bis((3-methoxypropyl)amino)-4-methyl-3-pyridinyl)azo)-3-methyl-, methyl ester), and C.I. Solvent Violet 49, all commercially available from Clariant in Switzerland; Sandoplast Blue 2B (C.I. Solvent Blue 104; 9,10-anthrecenedione, 1,4-bis(2,4,6-trimethylphenyl) amino)) and Sandoplast RBS-FP both commercially available from Sandoz in Switzerland, Clariant in Switzerland, or Sandoz Chemicals, Charlotte, N.C., USA; CuPc Blue (from Sun Chemical Corp, Cincinnati, Ohio, USA); and CI Pigment Red 263, CI Pigment Blue 29 (sodium alumino sulfosilicate), CI Pigment Violet 15, Holliday Pigments Ultramarine blue AR grade, 3 micron particles, Holliday Pigments Ultramarine blue DRM grade, 2 micron particles, and Holliday Pigments Ultramarine blue DRFX grade, 1 micron particles, all commercially available from Holiday Pigments (Kingston upon Hull, England). The acronym "C.I." denotes color index published by The Society of Dyers and Colourists, West Yorkshire, England, the publication is incorporated herein by reference. These toner compounds are well known to one skilled in the art and the description of which is omitted herein. The toner compound can be used with the catalyst disclosed herein in the amount of about 0.1 ppm to 1000 ppm, preferably about 1 ppm to about 100 ppm, and more preferably about 1 ppm to about 10 ppm, based on the weight of polyester produced.

The invention process can also be carried out using any of the conventional melt or solid state techniques and in the presence or absence of an optical brightening compound to reduce the yellowness of the polyester produced. Example of optical brightening compounds include, but are not limit to, 7-naphthotriazinyl-3-phenylcoumarin (commercial name "Leucopure EGM", from Sandoz Chemicals, Charlotte, N.C., USA.), 4,4'-bis(2-benzoxazolyl) stilbene (commercial name "Eastobrite", from Eastman Chemical, Kingsport, Tenn., USA). These optical brightening compounds are well known to one skilled in the art and the description of which is omitted herein. The optical brightening compound can be used with the catalyst disclosed herein in the amount of about 0.1 ppm to 10000 ppm, preferably about 1 ppm to about 1000 ppm, based on the weight of polyester produced.

The polyester produced by the invention process can comprise about 1 to about 200 parts per million by weight (ppm) of titanium and about 1 to about 200 ppm, preferably about 5 to about 100 ppm, of phosphorus.

According to the invention, the phosphorus compound can be present in the reaction medium before, during, or after an organic acid or ester thereof is esterified or transesterified. Similarly, it can be present before, during, or after the polycondensation stage. The phosphorus compound can be used to inhibit the catalytic activity of a titanium-containing catalyst, to reduce the discoloration of polyester produced using a titanium-containing catalyst, or both. The phosphorus compound can be mixed with the catalyst, such as titanium, antimony, manganese, zinc, before the catalyst is introduced to the polyester reaction process. Alternatively, the phosphorous compound can be introduced to the process separately before or after the catalyst is introduced.

For example, in a TPA process disclosed in the BACKGROUND OF THE INVENTION, a titanium catalyst, alone or with other catalyst such as antimony can be used as polycondensation catalyst for an oligomer. Alternatively, a titanium-containing catalyst can be present in the ester exchanger to accelerate transesterification reaction or in the esterifier to accelerate the esterification reaction. Generally, titanium-containing catalyst is more active in polycondensation reaction than in esterification or transesterification. The proper level of titanium-containing catalyst for esterification or transesterification can be an excess level for polycondensation. When titanium-containing catalyst presented in the esterifier or ester exchanger (transesterifier) is an excess for polycondensation, or when polycondensation is intended with a non titanium-containing catalyst such as antimony, part of or all of the titanium catalyst is preferably deactivated or inhibited after esterification or transesterification with a phosphorous compound disclosed above in composition component (C), to avoid discoloration of the polymer.

The titanium-containing catalyst present in the polymer can cause increased degradation and yellowness in the future processing. Part of or all of the titanium catalyst can be deactivated or inhibited after polymerization with a phosphorous compound disclosed above in composition component (C), to avoid discoloration of the polymer.

Similarly, when manganese, zinc, or other catalysts are used as esterification or transesterification catalyst and titanium-containing catalyst is used as polycondensation catalyst, these catalysts can be deactivated by the presence of a phosphorous compound disclosed above in composition component (C).

Furthermore, many packaging materials such as bottle resin require low turbidity in polymer. Antimony and cobalt in combination with phosphoric acid are commonly used for producing polyester for packaging materials. Unfortunately, phosphoric acid reacts with antimony and cobalt to form insoluble solids, which leads to high turbidity. Therefore, a preferred process is introducing a phosphorus compound, which does not react with a metal or metal-containing compound such as antimony and cobalt to form insoluble solids. The phosphorous compound can be the same as disclosed above in component (C). The phosphorus compound can be present before, during, or after the polycondensation.

According to a further embodiment of the invention, a process for producing polyester having reduced insoluble particles or solids is provided. The process can comprise contacting a carbonyl compound, in the presence of a metal or metal compound, with an alcohol. The carbonyl compound and alcohol can be the same as those disclosed above. The metal or metal compound can be a metal or a metal-containing compound including, but not limited to, $TiO_2$, antimony oxide, antimony glycolate, antimony acetate, manganese acetate, zinc oxide, zinc acetate, cobalt acetate, aluminum compound, germanium compound, titanium composition, or combinations of two or more thereof. These metals or metal compounds are well known to one skilled in the art.

In the manufacturing of fibers, phosphoric acid that is commonly used during the manufacturing process reacts with antimony, manganese, cobalt, aluminum, and/or titanium dioxide, to form insoluble particles or solids. The insoluble solids can plug the spinnerets of fiber manufacturers, or polymer filter packs, causing high pack pressure and frequent process shutdown to replace spinnerets or filter packs. Therefore, a preferred process is to introduce a phosphorus compound that does not form solids with the metal or metal-containing compound into the manufacturing process. The phosphorous compound can be the same as that disclosed above in component (C). The phosphorus compound can be present before, during, or after the polycondensation.

EXAMPLES

The following Examples are provided to further illustrate the invention and are not to be construed as to unduly limit the scope of the invention. All TYZOR® products noted in the examples were obtained from DuPont, Wilmington, Del., USA. All concentrations (% or ppm (parts per million)), unless otherwise indicated, are by weight.

Antimony glycolate solution was prepared as follows. Antimony glycolate (1.421 kg) obtained from Elf Atochem (Carollton, Ky., U.S.A.) was mixed with ethylene glycol (81.6 kg) in a mix tank. The mixture was agitated, heated to 100° C., and kept at 100° C. for 30 minutes. The antimony glycolate was completely dissolved in the glycol, the solution contained 1% Sb.

Catalyst A solution was prepared as follows. TYZOR® TPT (tetraisopropyl titanate; TPT; 0.97 kg) was slowly added to 163 kg of ethylene glycol in an agitated mix tank at ambient temperature. The solution contained 0.1% Ti.

Catalyst B solution was prepared as follows. Ethylene glycol (8.12 kg) and potassium tripolyphosphate (KTPP; 0.3 kg) were charged to a mix tank and agitated 1 hour at 60° C. to produce a clear solution, to which was added 1.13 kg of TPT to produce 9.5 kg of a clear solution containing 2% Ti. This solution was mixed with 181.4 kg of ethylene glycol to produce a solution containing 0.1 % Ti.

Catalyst C was prepared as follows. A 250 ml flask equipped with an agitator, $N_2$ inlet, heating mantle, dropping funnel and condenser was charged with 100 g (0.17 moles) of TYZOR® LA, an aqueous solution of titanium bis-ammonium lactate prepared by adding two moles of lactic acid to TPT followed by addition of water, removal of by-product isopropyl alcohol, and neutralization with 28% aqueous ammonium hydroxide solution. Agitation was started and 30 g (0.17 moles) of 50% aqueous solution of sodium hypophosphite was added. The reaction mass was agitated at room temperature for 2 hr to give 130 g of a colorless, clear solution containing 6.3% Ti.

Example 1

Polyethylene terephthalate fibers were produced in a continuous process pilot plant, from terephthalic acid (TPA)

as follows. The polyester esterification, polycondensation, and spinning process are well known to one skilled in the art, only a brief description is provided herein.

A TPA slurry tank was continuously charged with 44 to 57 kg/hour of TPA and ethylene glycol. The charge rate was controlled by a powder screw feeder to keep desired polymer flow rate of 54 to 66 kg/hour. Ethylene glycol flow rate was controlled by a mass flow meter such that the molar ratio of ethylene glycol and TPA was 2.2. The ethylene glycol was a mixture of virgin glycol and recycled glycol from the condensed vapor from esterifier and prepolymerizers and finisher. The temperature in the slurry tank was about 80° C. The TPA slurry was injected into a recirculating esterifier at a rate to keep desired polymer flow rate and constant oligomer liquid level in the esterifier. The temperature in the esterifier was controlled at 282 to 284° C. The vapor from the esterifier was condensed and separated into ethylene glycol and water, the glycol was mixed with the condensed glycol from the vapor from prepolymerizers and finisher, and then mixed with virgin glycol and charged into the TPA slurry.

The oligomer from the esterifier had degree of polymerization 5 to 10. Additives such as catalyst, delusterant TiO2, inhibitor and color control agent, were injected into the oligomer line before the first prepolymerizer. The injection rate was controlled by meter pumps and calibrated by burette check to obtain the desired concentrations in polymer. A 1% Sb solution or 0.1% Ti solution was injected into oligomer line followed by a static mixer to obtain desired catalyst concentration in polymer. Anatase $TiO_2$ (grade LW-S-U, from Sachtleben Chemie GmbH, Duisburg, Germany) slurry was then injected into oligomer line followed by a static mixer in the piping. For clear polymer, 5% $TiO_2$ in ethylene glycol slurry was injected to obtain 0.025 to 0.045% $TiO_2$ in polymer. For semidull polymer, 10% $TiO_2$ in ethylene glycol was injected to obtain 0.25 to 0.35% $TiO_2$ in polymer. For dull polymer, 20% $TiO_2$ in ethylene glycol was injected to obtain 1.4 to 1.6% $TiO_2$ in polymer. Carbazole violet described above was injected together with $TiO_2$ slurry to obtain 2 ppm Carbazole violet in polymer except the cases of antimony catalyst.

Di(polyoxyethylene) hydroxymethyl phosphonate ("Victastab" HMP, from Akzo Nobel, Louisville, Ky., USA, 1.523 kg) was added to 80.3 kg of ethylene glycol in an agitated mix tank at ambient temperature to make a solution containing 0.158% phosphorus. Similarly, 5% $H_3PO_4$ in ethylene glycol solution (2.27 kg) was added to 20.4 kg of ethylene glycol to make a solution containing 0.5% $H_3PO_4$ or 0.158% phosphorus. These solutions were injected into oligomer line after catalyst and $TiO_2$, followed by a static mixer, to obtain desired phosphorous concentration in polymer.

The oligomer was pumped to the first prepolymerizer controlled at 275° C., absolute pressure 120 mm Hg (16 kPa). The prepolymer from the first prepolymerizer flowed into the second prepolymerizer and then to a final polymerizer or finisher. The second prepolymerizer was controlled at 280° C. and 30 mm Hg (4 kPa). The final polymerizer or finisher was controlled at 285° C. and at an absolute pressure controlled by an online melt viscometer. The online melt viscometer was used to determine polymer molecular weight, which was calibrated by polymer solution viscosity in a laboratory. The evaporated glycol and water from the two prepolymerizers and finisher were condensed and mixed with the recycle glycol from esterifier, and then mixed with virgin glycol and metered and fed into the TPA slurry tank.

The polymer from the final polymerizer was pumped to a spinning machine. The polymer transfer line temperature was controlled at 285° C. Partially oriented yarn (POY) of 34 filaments with total denier 265 g/9000 m was wound to a tube, 8 tubes were wound simultaneously. The filaments had round cross section. Spinning speed was 3,283 meters/min. The wound tubes were taken away from the winding machine hourly. Polymer flow rate in the spinning pack was controlled by a meter pump and adjusted to obtain the desired denier. Polymer flow rate in the spinning pack was about 46.4 kg/hour. The ballast polymer which did not flow into spinning machine was pumped to a waste drum.

Polymer samples were taken in spinning machine before finishes were applied, which were analyzed in the laboratory for intrinsic viscosity (I.V.), ingredient concentrations of $TiO_2$, P, Sb, Mn, Co, as well as diethylene glycol and carboxyl end groups (COOH). The POY tubes were analyzed for color in a Hunter color instrument, and physical properties such as denier, draw tension, tenacity, elongation, boil off shrinkage, and dry heat shrinkage.

Results are given in the table below. In the I.V. analysis, measured by solution viscosity in hexafluoroisopropanol (HFIP), weighed polymer sample was dissolved in HFIP to make 4.75% solution. The drop time of the solution at 25° C. was measured using a constant volume viscometer in an Octavisc® auto viscometer system.

Color of the resulting oligomer and any polymer produced therefrom was measured in terms of the L-value and b-value, using a Hunter color instrument. The L-value shows brightness, with the greater the numerical value showing higher (desirable) brightness. The b-value shows the degree of yellowness, with a higher numerical value showing a higher (undesirable) degree of yellowness.

This example illustrates the ability to achieve 20% higher polymerization rates with titanium catalyst, while maintaining equivalent optical properties. Carbazole violet was used as toner except in the cases of antimony catalyst; and HMP was used as color stabilizer, except in the cases of antimony catalyst and one case of titanium catalyst. The results are shown in Table 1 below.

TABLE 1

| Catalyst (ppm) | Polymer flow rate kg/hr | P source (P ppm) | Finisher pressure (mmHg) | I.V. | L color | b color |
|---|---|---|---|---|---|---|
| Clear | | | | | | |
| Sb (Sb 220) | 54 | $H_3PO_4$ (7) | 6.90 | 0.686 | 78.2 | 3.40 |
| A (Ti 12) | 66 | HMP (20) | 3.58 | 0.695 | 80.8 | 2.40 |
| B (Ti 10)* | 56 | HMP (10) | 3.30 | 0.674 | 77.5 | 1.72 |
| C (Ti 10)* | 56 | HMP (10) | 3.34 | 0.676 | 77.9 | 1.34 |
| Semidull | | | | | | |
| Sb (Sb 220) | 54 | $H_3PO_4$ (10) | 5.36 | 0.685 | 84.1 | 0.74 |
| A (Ti 20) | 59 | HMP (20) | 2.94 | 0.683 | 85.0 | 0.18 |
| A (Ti 20) | 66 | HMP (20) | 2.56 | 0.690 | 85.0 | 0.35 |
| B (Ti 35)* | 56 | $H_3PO_4$ (10) | 2.47 | 0.673 | 85.6 | 2.89 |
| Dull | | | | | | |
| Sb (Sb 220) | 54 | $H_3PO_4$ (10) | 4.70 | 0.673 | 87.0 | 0.98 |
| A (Ti 75) | 66 | HMP (20) | 3.63 | 0.678 | 86.7 | 1.48 |

*"Polymer grade" TPA from DuPont, Wilmington, North Carolina, U.S.A. was used. All other cases used purified TPA from Amoco, Alpharetta, Georgia, USA, which had lower impurities.

Example 2

This example illustrates the production of polyester fibers from dimethyl terephthalate (DMT) at polymer flow rate 56 kg/hour. Polyethylene terephthalate fibers were produced in a continuous process pilot plant from DMT as follows. The polyester transesterification, polycondensation, and spinning process are well known to one skilled in the art, only a brief description is provided herein.

The ester exchanger was a vertical reactive distillation column with 20 plates, the bottom plate was the $1^{st}$ plate, top plate the $20^{th}$ plate. Molten DMT at 175° C. was continuously charged to the $16^{th}$ plate at about 56 to 57 kg/hour to obtain 56 kg/hour of polymer flow rate. Catalyst-containing ethylene glycol solution at 185° C. was continuously charged into the $17^{th}$ plate. Virgin ethylene glycol was continuously charged into the bottom calandria (heat exchanger). The mole ratio of catalyzed glycol to virgin glycol was 4.0, the mole ratio of total glycol and DMT was 2.0. Catalyst-containing glycol solution was made in batch, for each batch 544 kg of ethylene glycol, 0.590 kg of manganese acetate tetrahydrate (Mn in polymer 125 ppm), 0.115 kg of sodium acetate, and 0.888 kg of antimony glycolate (in cases of antimony catalyst) were mixed in an agitated mix tank. The $13^{th}$ plate temperature was controlled at about 180° C. The $19^{th}$ plate temperature was controlled at 110–115° C. by methanol reflux.

The monomer from the ester exchanger calandria was pumped into the first prepolymerizer. Additives such as inhibitor and color control agent, delusterant TiO2, and titanium catalyst were injected into the monomer line before the first prepolymerizer. The ingredient injection rate was controlled by meter pumps and calibrated by burette check to obtain desired ingredient concentrations in polymer.

HMP (3.153 kg) was added to 81.6 kg of ethylene glycol to make a solution containing 0.316% phosphorus. Triethylene phosphonoacetate (TEPA, from Albright & Wilson America, Richmond, Va., U.S.A., 1.913 kg) was added to 81.6 kg of ethylene glycol to make a solution containing 0.316% phosphorus. Potassium tripolyphosphate (KTPP, from FMC Corp., Philadelphia, Pa., USA, 0.714 kg) was added to 22.7 kg of ethylene glycol to make a solution containing 0.316% phosphorus. A 10% $H_3PO_4$ in ethylene glycol solution (11.4 kg) was added to 11.3 kg of ethylene glycol to make a solution containing 5.0% $H_3PO_4$ 5.0% or 1.58% phosphorus. These inhibitor solutions were injected into monomer fine followed by a static mixer, to obtain desired phosphorous concentration in polymer.

Anatase $TiO_2$ slurry was then injected into monomer line followed by a static mixer. For clear polymer, 5% $TiO_2$ in ethylene glycol slurry was injected to obtain 0.025 to 0.045% $TiO_2$ in polymer. For semi-dull polymer, 10% $TiO_2$ in ethylene glycol was injected to obtain about 0.25 to 0.35% $TiO_2$ in polymer. For dull polymer, 20% $TiO_2$ in ethylene glycol was injected to obtain 1.4 to 1.6% $TiO_2$ in polymer. Carbazole violet described above was injected together with $TiO_2$ slurry to obtain 2 ppm Carbazole violet in polymer except the cases of antimony catalyst. In case of titanium catalyst, 0.1% Ti solution was injected into monomer line followed by a static mixer to obtain desired catalyst concentration in polymer.

The first prepolymerizer temperature was controlled at 250° C., absolute pressure 100 mm Hg (13.33 kPa). The prepolymer from the first prepolymerizer flowed into the second prepolymerizer and then to a final polymerizer or finisher. The second prepolymerizer, finisher, polymer transfer line, spinning process, as well as the analysis of polymer and yam properties were the same as those described in Example 1.

As shown in Table 2, the optical properties of polymers produced using the titanium-containing catalysts and phosphorus compound stabilizers were similar to that achieved with antimony catalyst.

TABLE 2

| Catalyst (ppm) | P source (P ppm) | Finisher pressure (mm Hg) | I.V. | L color | b color |
|---|---|---|---|---|---|
| Clear |  |  |  |  |  |
| Sb (Sb 466) | $H_3PO_4$ (80) | 2.90 | 0.674 | 79.5 | 2.49 |
| A (Ti 15) | HMP (80) | 3.28 | 0.681 | 78.8 | 2.25 |
| C (Ti 10) | HMP (70) | 2.40 | 0.673 | 79.1 | 2.63 |
| Semi-dull |  |  |  |  |  |
| Sb (Sb 408) | $H_3PO_4$ (80) | 3.19 | 0.677 | 85.6 | 2.44 |
| A (Ti 20) | TEPA (70) | 2.14 | 0.660 | 85.3 | 1.47 |
| A (Ti 10) | KTPP (88) | 3.29 | 0.667 | 84.0 | 1.32 |
| A (Ti 16.3) | HMP (80) | 4.28 | 0.679 | 84.4 | 3.17 |
| Dull |  |  |  |  |  |
| A (Ti 20) | TEPA (70) | 3.11 | 0.659 | 86.1 | 1.63 |
| A (Ti 20) | HMP (80) | 2.99 | 0.676 | 86.3 | 2.29 |

Example 3

This example illustrates the properties of a polymer and partially oriented yarn (POY) produced with antimony catalyst and titanium catalyst. The polymer and POY were produced in the process described in Example 1. The POY had 34 filaments with total denier 265 g/9000 m, the filaments had round cross section. Spinning speed was 3,283 meters/min. The results in the following table were averages of 5 to 15 cases, each case was an average of 2 doff, each doff was an average of 8 tubes. As shown in Table 3, at the same spinning conditions, the POY of titanium catalyst had lower draw tension, lower shrinkage, lower tenacity, and higher elongation.

The analysis of intrinsic viscosity (I.V.) was described in Example 1. The analysis of draw tension, boil off shrinkage, dry heat shrinkage, tenacity, and elongation are well known to one skilled in the art, only a brief description is provided herein. In draw tension analysis, the yarn was fed into the draw tension machine at 169 meters/min and heated to 185° C., the draw ratio was 1.71, stress on a pin between feed roll and draw roll was recorded. In boil off shrinkage analysis, a filament of about 30 cm long was placed in boiling water at 100° C. for 30 minutes, the length before and after that was measured. In dry heat shrinkage, a filament of about 30 cm long was placed in an oven at 160° C. for 30 minutes, the length before and after that was measured. The tenacity and elongation were from stress-strain curve measured by Model 1122 or 1123 Instron. Instron is a commercial testing equipment equipped with a strain gauge to measure force precisely, a "crosshead" that moves at a controllable constant speed, a chart recorder to record a graph of force vs. crosshead movement, and provision for interfacing with a computer to read and process force and motion data.

TABLE 3

| Catalyst | I.V. | Draw tension (g) | Boil off shrinkage (%) | Dry heat shrinkage (%) | Tenacity (g/denier) | Elongation at break (%) |
|---|---|---|---|---|---|---|
| Clear | | | | | | |
| Sb | 0.688 | 118.7 | 64.65 | 67.15 | 2.620 | 124.8 |
| Ti | 0.683 | 116.3 | 62.87 | 64.76 | 2.545 | 126.3 |
| Semidull | | | | | | |
| Sb | 0.681 | 119.0 | 65.42 | 67.47 | 2.585 | 124.2 |
| Ti | 0.681 | 115.4 | 64.24 | 67.09 | 2.533 | 125.2 |
| Dull | | | | | | |
| Sb | 0.670 | 119.6 | 63.08 | 64.03 | 2.635 | 127.4 |
| Ti | 0.671 | 118.4 | 60.63 | 61.54 | 2.564 | 128.6 |

Example 4

This example produced bottle resin in the continuous pilot plant in a TPA-based process with a polymer flow rate of 54.4 kg/hour. In this example, purified TPA and purified isophthalic acid (IPA) from Amoco, Alpharetta, Ga., USA, were used, except the last case of Catalyst B combining TEPA, in which "Polymer Grade" TPA described in Example 1 and purified IPA were used. The mole ratio of TPA to IPA in polymer was 98:2. Cobalt acetate was added in oligomer line to reduce polymer yellowness for both antimony and titanium catalyst. In cases of antimony catalyst, phosphoric acid solution was injected into TPA slurry tank, or TEPA was injected into oligomer line. In cases of titanium catalyst, HMP or TEPA was injected into oligomer line.

The esterification and polycondensation process was similar to that described in Example 1, except that the esterifier temperature was 284° C., the first prepolymerizer was operated at 265° C. at 90 mm Hg (12 kPa), the second prepolymerizer was operated at 275° C. and 35 mm Hg (4.67 kPa), and the finisher temperature was 282° C. Polymer temperature in the transfer line from finisher to casting machine was 282° C. The molten polymer was casted with cooling water and cut to obtain flake of 0.44 g per 25 particles.

Intrinsic viscosity, L color, and b color were determined as disclosed above. Turbidity was a measure of cloudiness in polymer resin and was determined by dissolving a weighed flake sample in HFIP followed by reading with a Hach Model 2100AN Turbidimeter. The lower the turbidity number, the clear the polymer was.

Acetaldehyde was measured as follow. (1) Sample preparation. Four (4) grams of polymer was added to a cryogrinding tube. The tube was cooled in liquid nitrogen for 1.5 minutes. It was then impact ground for 3 minutes, and cooled to room temperature for 90 minutes. About 1 g of material was charged to a 22 ml headspace vial and sealed; the weight was recorded. (2) Gas chromatograph. The sample was then injected with a Hewlett Packard HP 7694 automated headspace sampler, which was coupled to Hewlett Packard 5890 gas Chromatograph instrument. The injector temperature was 160° C., the detector temperature was 250° C., column was DB-wax with ID 0.53 mm, length 30 meters, 1.0 micron film thickness, the detector type was flame ionization. Acetaldehyde concentration was calculated from the area comparing to a standard.

The result in Table 4 show that TEPA reduced turbidity and improved L and b color of polymer containing antimony catalyst compared with phosphoric acid. The results also show polymer produced with titanium catalyst in combination with TEPA and/or HMP had lower turbidity compared with polymer produced with antimony in combination with phosphoric acid. The use of titanium-containing catalyst in combination with TEPA and/or HMP also improved polymer color.

TABLE 4

| Catalyst (ppm) | P source (P ppm) | Co (ppm) | Finisher pressure (mmHg) | I.V. | L color | b color | Acetaldehyde | Turbidity |
|---|---|---|---|---|---|---|---|---|
| Sb (230) | H$_3$PO$_4$ (30) | 30 | 3.92 | 0.645 | 58.6 | 1.35 | 38 | 108 |
| Sb (230) | H$_3$PO$_4$ (30) | 48 | 4.28 | 0.638 | 52.0 | −1.18 | 43 | 111 |
| Sb (230) | H$_3$PO$_4$ (40) | 57 | 3.79 | 0.639 | 52.2 | −2.20 | 39 | 129 |
| Sb (230) | TEPA (40) | 30 | 3.61 | 0.637 | 56.5 | −0.22 | 40 | 44 |
| Sb (230) | TEPA (40) | 45 | 3.45 | 0.637 | 54.4 | −2.17 | 36 | 59 |
| A (Ti 40) | HMP (40) | 60 | 2.40 | 0.637 | 52.1 | −3.11 | 40 | 31 |
| A (Ti 25) | HMP (30) | ** | 3.27 | 0.637 | 52.4 | 1.14 | 41 | 60 |
| B (Ti 25) | TEPA (40) | 30 | 3.09 | 0.637 | 51.9 | 2.54 | 41 | 39 |

** 4 ppm of Estofil Blue S-RLS ® and Solvent Blue 45TM mixture (from Sandoz Chemicals, Charlotte, North Carolina, U.S.A) in polymer.

Example 5

This example illustrates the ability to use the titanium-containing catalysts of this invention as esterification catalysts. The esterification, polycondensation, and flake casting process were the same as those described in Example 4. Catalyst B disclosed above (titanium in glycol solution stabilized by alkali salt of polyphosphoric acid) was added to the TPA slurry, before the esterification step of the process. The Ti concentration used was 25 ppm of polymer, and the polymer flow rate was 54.4 kg/hour of polymer.

The number of carboxyl end groups of TPA was one of the indications of the degree of polymerization in oligomer. No catalyst was added into esterifier in Example 4, the average carboxyl end groups of oligomer was 687 meq/kg. In Example 5, 25 ppm Ti of catalyst B was added before esterifier, oligomer carboxyl end group decreased to 400 meq/kg at the same throughput and process conditions. This showed esterifier capacity could be increased with titanium catalyst.

In this test, the titanium catalyst added in TPA slurry was deactivated by addition of TEPA after esterification but before polycondensation. The injected phosphorus was 40 ppm of polymer, the measured phosphorus in polymer by X-ray was 27 ppm, which indicated part of the injected TEPA was evaporated. Antimony was injected in the oligomer line as polycondensation catalyst. Cobalt acetate was added with antimony to control polymer color, injected cobalt was 30 ppm of polymer. The amorphous polymer flake had L color 51.9 and b color 2.5.

Example 6

This example further shows that a catalyst composition containing, or produced from, a titanium compound and either a complexing agent or a combination of a solubility promoter and a phosphorus source, when used with a phosphorus compound, also produce a polymer having good optical property.

In the tables below, Catalyst C was the same as that disclosed above. Catalyst D was produced as follows. A 500 ml flask, equipped with an agitator, condenser, dropping funnel and $N_2$ purge was charged with 109 g (1.76 moles) of ethylene glycol. Agitation was started and 100 g (0.704 moles) of phenylphosphinic acid was added. The slurry was heated to 35–45° C. until the solid dissolved, then 50 g (0.176 moles) of TPT was added dropwise over 1 hour at 35° C. When addition was complete the reaction mass was stirred for 30 minutes, and then 109.8 g (0.528 moles) of tetraethyl orthosilicate was added over 30 minutes. A clear solution containing 2.3% titanium was obtained.

A 1-liter resin kettle was provided with a Jiffy Mixer agitator rotating at 40 rpm, a thermocouple, condenser and nitrogen sweep. To this kettle was added a catalyst shown in the table, 160 gm of ethylene glycol, and 500 gm of terephthalic acid oligomer prepared in example 1 above. The agitator was turned on and the temperature was increased to 275° C. over a period of about 2.5 hours. The contents were polymerized by holding under agitation at 275° C. and a pressure of 120 mm Hg (16.0 kPa) for 20 minutes, and at 280° C. and a pressure of 30 mm Hg (4 kPa) for an additional 20 minutes. The contents were then held under agitation at 285° C. at 1 to 2 mm Hg pressure for a time sufficient to reach 15 ounce-inch (0.106 Newton-meter) torque as measured by an Electro-Craft Motomatic torque controller. The time for this step was recorded as the Finish Time, and varied with the catalyst used. The polymer melt was then poured into a water bath to solidify the melt, and the resultant solid annealed at 150° C. for 12 hours and ground to pass through a 2 mm filter for color measurements using the previously described spectrophotometer. Results are shown in the following Tables 5 and 6.

TABLE 5

| Run | Catalyst[1] | Polymerization time (min) | L color | a color | b color |
|-----|-----------|---------------------------|---------|---------|---------|
| 1 | C (Ti 25) | 80 | 77.5 | 0.8 | 8.61 |
| 2 | C (Ti 25)[2] | 90 | 81.74 | −0.38 | 3.89 |
| 3 | C (Ti 25) | 65 | 76.97 | −0.8 | 10.89 |
| 4 | C (Ti 25)[3] | 90 | 88.85 | −0.61 | 5.05 |

[1]The value in parentheses denote concentration Ti in parts per million by weight
[2]0.67 moles of HMP added to autoclave
[3]0.67 moles of HMP added to autoclave

TABLE 6

| Catalyst[1] | HMP (ppm P) | L color | a color | b color | whiteness |
|-----------|-------------|---------|---------|---------|-----------|
| Sb glycolate (107) | 7 | 86.3 | −0.26 | 2.02 | 63.8 |
| D (Ti 8) | 14 | 86.2 | −0.20 | 1.42 | 67.2 |
| D (Ti 8) | 10 | 86.5 | 0 | 0.79 | 70.9 |

[1]The value in parentheses denote concentration of Sb or Ti indicated in parts per million by weight These two tables show that runs 2 and 4 (invention process) produced a polymer having better optical properties (higher L color, lower b color, and better a color) than runs 1 and 3. The results further show that the invention process is applicable to the commonly used antimony-containing catalyst.

Example 7

This example shows that some phosphorus compounds do not form clear solutions in ethylene glycol with titanium glycolate. Combination or reaction of titanium glycolate solution (Ti 1%) with phosphoric acid, phosphorous acid ($H_3PO_3$), triphenyl phosphite (TPP), or phenylphosphinic acid (PPA) formed cloudy solutions or colloids. Combination or reaction of titanium glycolate solution (Ti 1%) with TEPA and HMP formed clear solution. Table 7 below (EG, ethylene glycol) indicates TEPA or HMP can be used with titanium catalyst to reduce insoluble particles or solids in polymer.

TABLE 7

| Ti glycolate | Phosphorous solution | Mixture observations |
|--------------|----------------------|----------------------|
| 10 grams | $H_3PO_4$ 1% in EG, 1.30 g | Yellow solution, then it became thicker, then colloid |
| 10 grams | $H_3PO_3$ 1% in EG, 1.10 g | White cloudy solution with blue tone, then colloid |
| 10 grams | TPP 97% liquid, 0.11 g | Two phases. Added $H_2O$ 1 g, became cloudy and thicker |
| 22 grams | PPA crystal, 0.44 g | Agitated 30 minutes to dissolve, then cloudy solution |
| 10 grams | HMP liquid, 1.1 g | After shaking, completely dissolved, clear solution |
| 10 grams | TEPA liquid, 1.1 g | After shaking, completely dissolved, clear solution |

Example 8

This example shows commonly used phosphoric acid reacts with antimony, cobalt, or TiO2 to form insoluble solids or flocculates, which cause more deposits on polymer filter and fiber spinnerets, and high turbidity in polymer resin.

A portion (10 g) of the 1% antimony glycolate solution described above and 1 g of a phosphoric acid solution (1% $H_3PO_4$ in ethylene glycol) were mixed in an open glass beaker. A cloudy solution formed after shaking. Upon addition of another 9 g of this 1% phosphoric acid solution, the mixture remained cloudy.

This cloudy solution contained 0.158% phosphorous and 0.500% antimony by weight. Two hours later, top 6 ml became clear liquid, bottom 12 ml became antimony colloid, small bubble went up. Fifty-four hours later, top 8 ml was clear liquid mainly ethylene glycol, bottom 10 ml was white milky antimony colloid. After 11 days, it remained the same.

A cobalt solution was obtained by dissolving cobalt acetate tetrahydrate ($CoAc.4H_2O$, 4 g) in ethylene glycol (36 g) to produce a cobalt glycolate solution containing 10% cobalt acetate tetrahydrate. After stirring for 60 minutes, large particles dissolved, it became uniform red purple solution. A portion (9 g) of the cobalt acetate tetrahydrate solution and 1 g of a phosphoric acid solution (10% $H_3PO_4$ in ethylene glycol) were mixed in an open glass beaker. After shaking, flocculates in dark bluish purple formed in the bottom of the glass beaker. After 10 days, top 3 ml was red liquid mainly ethylene glycol, bottom 7 ml was dark purple flocculates.

$TiO_2$ in ethylene glycol 20% slurry was prepared by sand milling 55% $TiO_2$ in ethylene glycol slurry twice and diluted with ethylene glycol to 20% and filtered to remove large particles.

$TiO_2$ in ethylene glycol slurry ($TiO_2$ 20%, 20 g) and phosphorous acid in ethylene glycol solution ($H_3PO_3$ 1%, 10 g) were mixed in an open graduated cylinder, total volume was approximately 25 ml. After 3 days, it separated into two layers, top 3 ml clear liquid mainly ethylene glycol, bottom 22 ml $TiO_2$ agglomerates.

$TiO_2$ in ethylene glycol slurry ($TiO_2$ 20%, 20 g) and phosphoric acid in ethylene glycol solution ($H_3PO_4$ 1%, 12 g) were mixed in an open graduated cylinder, total volume was approximately 27 ml. After 3 days, it separated into two layers, top 3.6 ml clear liquid mainly ethylene glycol, bottom 23.4 ml $TiO_2$ agglomerates.

Example 9

This example shows TEPA does not form insoluble solids or flocculates when mixed with antimony, cobalt, TiO2, and other metals. Therefore, insoluble particles or solids in polymer can be significantly reduced when commonly used phosphoric acid is replaced with TEPA. In this example, 1% antimony in ethylene glycol solution, 10% cobalt acetate tetrahydrate in ethylene glycol solution, and 20% $TiO_2$ in ethylene glycol slurry were prepared as disclosed in Example 8.

A portion (9 g) of the antimony solution and 1 g of TEPA liquid were mixed in an open glass beaker. It became a clear solution after shaking. After 3 days in the open glass beaker, it remained clear.

When the cobalt acetate tetrahydrate solution was used in place of the antimony solution, a clear solution was produced, which remained clear after 10 days.

Similarly, mixing 20 g of the $TiO_2$ slurry with 2 g of TEPA liquid produced a single-phased white slurry. After 3 days, it was uniformly white $TiO_2$ slurry with no phase separation. After 10 days, it was still in single phase and had no separation with very small amount of $TiO_2$ particles settled in the bottom, which also happened without TEPA.

Example 10

This example shows HMP does not form insoluble solids or flocculates when mixed with antimony, and cobalt solutions; but it flocculates $TiO_2$ slurry. Therefore, insoluble particles or solids from a metal-containing compound, except $TiO_2$, in polymer can be significantly reduced when commonly used phosphoric acid is replaced by HMP. In this example, the antimony solution, cobalt acetate tetrahydrate solution, and $TiO_2$ slurry were prepared as disclosed in Example 8.

After 9 g of the antimony solution and 1 g of HMP liquid were mixed and shaken in an open glass beaker, a clear solution containing 0.77% phosphorous and 0.91% antimony was produced. After 11 days, it remained clear.

Similarly, 20 g of the $TiO_2$ slurry and 2 g of HMP liquid were mixed in an open graduated cylinder. After shaking, it became a single-phased white slurry. After 54 hours, it was separated into two phases, the top 3 ml was clear liquid mainly ethylene glycol, the bottom 17 ml was white $TiO_2$ slurry and flocculates. After 10 days, top 8 ml was clear liquid mainly glycol, bottom 12 ml was $TiO_2$ flocculates and settling.

Example 11

This example shows the salt of polyphosphoric acid with the formula of $H_{n+2}P_nO_{3n+1}$ ($n \geq 2$) does not form solids when mixed with a metal-containing catalyst solution such as antimony solution.

Potassium pyrophosphate (KPP, 10 g) was mixed with ethylene glycol (90 g). The mixture was heated at about 70° C. for about 1 hour to completely dissolve the KPP. Five (5) grams of this KPP solution was added to 10 g of the 1% Sb solution described above. The resulting Sb/KPP/Glycol solution contained 0.67% Sb and 0.63% P. The solution was clear. The solution in an open glass beaker was placed under the hood, it was still clear after two hours.

The invention claimed is:

1. A process comprising contacting, in the presence of a catalyst and a toner, a carbonyl compound with an alcohol wherein said catalyst comprises, or is produced from (A) a titanium compound, a component, a phosphorus compound, and optionally a second solvent; or (B) a titanium compound, a glycol, and either a phosphorus compound or water; or (C) a titanium compound, a solubility promoter, and optionally a phosphorus compound; or (D) a titanium compound; a combination of a solubility promoter, a phosphorus source, and optionally a first solvent, a phosphorus compound, or both; and further optionally a second solvent;

said carbonyl compound has the formula of $R^2COOR^2$; each $R^2$ is (1) hydrogen, (2) hydrocarboxyl radical having a carboxylic acid group at the terminus, or (3) hydrocarbyl radical in which each radical has 1 to about 30 carbon atoms per radical which is alkyl radical, alkenyl radical, aryl radical, alkaryl radical, or aralkyl radical, (4) a 5-sulfo isophthalate metal salt or its ester, or (5) combinations of two or more thereof;

said alcohol is ethanol, propanol, isopropanol, butanol, ethylene glycol, propylene glycol, isopropylene glycol, butylene glycol, 1-methyl propylene glycol, pentylene glycol, diethylene glycol, triethylene glycol, 2-ethyl hexanol, polyethylene glycol, polypropylene glycol, tertiary-1,4-butenediol polybutylene, poly(tetramethylene glycol), or combinations of two or more thereof;

said titanium compound has the formula Ti(OR)$_4$; each R is independently an alkyl radical, a cycloalkyl radical, aralkyl radical, or combinations of two or more thereof; each R contains from 1 to about 30 carbon atoms per radical;

said component is (i) a complexing agent, (ii) a combination of a complexing agent, hypophosphorous acid or a salt thereof, and optionally a first solvent, a zirconium compound, or both, or (iii) combinations of (i) and (ii);

said phosphorus compound is potassium tripolyphosphate, sodium tripolyphosphate, potassium tetra phosphate, sodium pentapolyphosphate, sodium hexapolyphosphate, potassium pyrophosphate, potassium pyrophosphite, sodium pyrophosphate, sodium pyrophosphate decahydrate, sodium pyrophosphite, ethyl phosphonate, propyl phosphonate, hydroxymethyl phosphonate, di(polyoxyethylene) hydroxymethyl phosphonate, methylphosphonoacetate, ethyl methylphosphonoacetate, methyl ethylphosphonoacetate, ethyl ethylphosphonoacetate, propyl dimethylphosphonoacetate, methyl diethylphosphonoacetate, triethyl phosphonoacetate, or combinations of two or more thereof;

said first or second solvent is water or an alcohol having 1 to about 10 carbon atoms per molecule;

said glycol is ethylene glycol, propylene glycol, isopropylene glycol, butylene glycol, 1-methyl propylene glycol, pentylene glycol, diethylene glycol, triethylene glycol, or combinations of two or more thereof;

said metal or metal compound is selected from the group consisting of TiO$_2$, antimony oxide, antimony glycolate, antimony acetate, manganese acetate, zinc oxide, zinc acetate, cobalt acetate, aluminum compound, germanium compound, titanium compound, and combinations of two or more thereof;

said solubility promoter is ortho silicate, ortho zirconate, or combinations thereof; and said phosphorus source is a phosphonic acid, a phosphonic acid, a phosphine, or combinations of two or more thereof.

2. A process according to claim 1 wherein said catalyst comprises, or is produced from, said titanium compound, said component, said phosphorus compound, and optionally said second solvent; said titanium compound is tetra-isopropyl titanate; said phosphorus compound is potassium tripolyphosphate, di(polyoxyethylene) hydroxymethyl phosphonate, or triethyl phosphonoacetate; and said complexing agent is lactic acid.

3. A process according to claim 2 further comprising introducing another phosphorus compound to said process, said another phosphorus compound is phosphoric acid, phosphorous acid, a polyphosphoric acid or salt thereof, a phosphonate ester, a pyrophosphoric acid or salt thereof, a pyrophosphorous acid or salt thereof, or combinations of two or more thereof.

4. A process according to claim 3 wherein said carbonyl compound is terephthalic acid or ester thereof; said alcohol is ethylene glycol; and said component is the combination of lactic acid and sodium hypophosphite.

5. A process according to claim 4 wherein said toner is cobalt aluminate; cobalt acetate; anthranquinones; anthrapyridones; Carbazole violet (CI pigment violet 23, diindolo[2,3-c:2'3'-n]triphenodioxazine, 9,19-dichloro-5,15-diethyl-5,15-dihydro-); Estofil Blue S-RLS®; Polysynthren Blue RLS (C.I. Solvent Blue 45); Polysynthren Blue R (C.I. Solvent Blue 122, acetamide, N-[4-[(9,10-dihydro-4-hydroxy-9,10-dioxo-1-anthracenyl)amino]phenyl]); Polysynthren Red GFP (C.I. Solvent Red 135, 12H-phthaloperin-12-one, 8,9,10,11-tetrachloro); Polysynthren Red BB (Solvent Red 195, 2-Thiophenecarboxylic acid, 4-cyano-5-((5-cyano-2,6-bis((3-methoxypropyl)amino)-4-methyl-3-pyridinyl)azo)-3-methyl-, methyl ester); C.I. Solvent Violet 49; Sandoplast Blue 2B (C.I. Solvent Blue 104. 9,10-anthrecenedione, 1,4-bis(2,4,6-trimethylphenyl)amino); Sandoplast RBS-FP; CuPc Blue; C.I. Pigment Red 263; C.I. Pigment Blue 29 (sodium alumino sulfosilicate); C.I. Pigment Violet 15; Holliday Pigments Ultramarine blue AR grade; 3 micron particles; Holliday Pigments Ultramarine blue DRM grade; 2 micron particles; and Holliday Pigments Ultramarine blue DRFX grade; or combinations of two or more wherein C.I. is color index.

6. A process according to claim 1 wherein said catalyst comprises or is produced from said titanium compound, said glycol, and said phosphorus compound or water; and said phosphorus compound is potassium tripolyphosphate, di(polyoxyethylene) hydroxymethyl phosphonate, or triethyl phosphonoacetate.

7. A process according to claim 6 further comprising introducing another phosphorus compound to said process, said another phosphorus compound is phosphoric acid, phosphorous acid, a polyphosphoric acid or salt thereof, a phosphonate ester, a pyrophosphoric acid or salt thereof, a pyrophosphorous acid or salt thereof or combinations of two or more thereof.

8. A process according to claim 7 wherein said carbonyl compound is terephthalic acid or ester thereof and said alcohol is ethylene glycol.

9. A process according to claim 8 wherein said toner is cobalt aluminate; cobalt acetate; anthranquinones; anthrapyridones; Carbazole violet (CI pigment violet 23, diindolo[2,3-c:2'3'-n]triphenodioxazine, 9,19-dichloro-5,15-diethyl-5,15-dihydro-); Estofil Blue S-RLS®; Polysynthren Blue RLS (C.I. Solvent Blue 45); Polysynthren Blue R (C.I. Solvent Blue 122, acetamide, N-[4-[(9,10-dihydro-4-hydroxy-9,10-dioxo-1-anthracenyl)amino]phenyl]); Polysynthren Red GFP (C.I. Solvent Red 135, 12H-phthaloperin-12-one, 8,9,10,11-tetrachloro); Polysynthren Red BB (Solvent Red 195, 2-Thiophenecarboxylic acid, 4-cyano-5-((5-cyano-2,6-bis((3-methoxypropyl)amino)-4-methyl-3-pyridinyl)azo)-3-methyl-, methyl ester); C.I. Solvent Violet 49; Sandoplast Blue 2B (C.I. Solvent Blue 104. 9,10-anthrecenedione, 1,4-bis(2,4,6-trimethylphenyl)amino); Sandoplast RBS-FP; CuPc Blue; C.I. Pigment Red 263, C.I. Pigment Blue 29 (sodium alumino sulfosilicate); C.I. Pigment Violet 15; Holliday Pigments Ultramarine blue AR grade; 3 micron particles; Holliday Pigments Ultramarine blue DRM grade; 2 micron particles; and Holliday Pigments Ultramarine blue DRFX grade; or combinations of two or more wherein C.I. is color index.

10. A process according to claim 1 wherein
said catalyst comprises or is produced from said titanium compound, said solubility promoter, and optionally said phosphorus compound;
said phosphorus source is phenyl phosphinic acid, diphenyl phosphinic acid, 3-(hydroxyphenylphosphinyl) propanoic acid, 1,2-bis-diphenylphosphinoethane, 1,3-bis-diphenylphosphinopropane, 1,4-bis-diphenylphosphinobutane, bis-4-tolylphosphine oxide, bis-3,5-xylylphosphine oxide, or combinations of two or more thereof; and
said solubility promoter is tetraethyl ortho silicate, tetra-n-propyl ortho silicate, tetra n-propyl ortho zirconate, tetra n-butyl ortho zirconate, and combinations of two or more thereof.

11. A process according to claim 10 wherein said catalyst composition comprises or is produced from said titanium compound, said solubility promoter, and said phosphorus compound; said titanium compound is tetra isopropyl titanate; and said solubility promoter is tetraethyl ortho silicate or tetra-n-propyl ortho silicate.

12. A process according to claim 11 further comprising introducing another phosphorus compound to said process, said another phosphorus compound is phosphoric acid, phosphorous acid, a polyphosphoric acid or salt thereof, a phosphonate ester, a pyrophosphoric acid or salt thereof, a pyrophosphorous acid or salt thereof, or combinations of two or more thereof.

13. A process according to claim 12 wherein said carbonyl compound is terephthalic acid or ester thereof and said alcohol is ethylene glycol.

14. A process according to claim 13 wherein said toner is cobalt aluminate; cobalt acetate; anthranquinones; anthrapyridones; Carbazole violet (CI pigment violet 23, diindolo[2,3-c:2'3'-n]triphenodioxazine, 9,19-dichloro-5,15-diethyl-5,15-dihydro-); Estofil Blue S-RLS®; Polysynthren Blue RLS (C.I. Solvent Blue 45); Polysynthren Blue R (C.I. Solvent Blue 122, acetamide, N-[4-[(9,10-dihydro-4-hydroxy-9,10-dioxo-1-anthracenyl)amino]phenyl]); Polysynthren Red GFP (C.I. Solvent Red 135, 12H-phthaloperin-12-one, 8,9,10,11-tetrachloro); Polysynthren Red BB (Solvent Red 195, 2-Thiophenecarboxylic acid, 4-cyano-5-((5-cyano-2,6-bis((3-methoxypropyl)amino)-4-methyl-3-pyridinyl)azo)-3-methyl-, methyl ester); C.I. Solvent Violet 49; Sandoplast Blue 2B (C.I. Solvent Blue 104. 9,10-anthrecenedione, 1,4-bis(2,4,6-trimethylphenyl)amino); Sandoplast RBS-FP; CuPc Blue; C.I. Pigment Red 263; C.I. Pigment Blue 29 (sodium alumino sulfosilicate); C.I. Pigment Violet 15; Holliday Pigments Ultramarine blue AR grade; 3 micron particles; Holliday Pigments Ultramarine blue DRM grade; 2 micron particles; and Holliday Pigments Ultramarine blue DRFX grade; or combinations of two or more wherein C.I. is color index.

15. A process according to claim 1 wherein
said catalyst comprises or is produced from said titanium compound; said combination of a solubility promoter, said phosphorus source, optionally said first solvent, said phosphorus compound, or both; and optionally said second solvent;
said phosphorus source is phenyl phosphinic acid, diphenyl phosphinic acid, 3-(hydroxyphenylphosphinyl) propanoic acid, 1,2-bis-diphenylphosphinoethane, 1,3-bis-diphenylphosphinopropane, 1,4-bis-diphenylphosphinobutane, bis-4-tolylphosphine oxide, bis-3,5-xylylphosphine oxide, or combinations of two or more thereof; and
said solubility promoter is tetraethyl ortho silicate, tetra-n-propyl ortho silicate, tetra n-propyl ortho zirconate, tetra n-butyl ortho zirconate, and combinations of two or more thereof.

16. A process according to claim 15 wherein said catalyst composition comprises or is produced from said titanium compound, said solubility promoter, said phosphorus source, said first solvent, said phosphorus compound, and said second solvent; said titanium compound is tetra isopropyl titanate; said first solvent is ethylene glycol; said solubility promoter is tetraethyl ortho silicate or tetra-n-propyl ortho silicate and said second solvent is ethylene glycol.

17. A process according to claim 16 further comprising introducing another phosphorus compound to said process, said another phosphorus compound is phosphoric acid, phosphorous acid, a polyphosphoric acid or salt thereof, a phosphonate ester, a pyrophosphoric acid or salt thereof, a pyrophosphorous acid or salt thereof, or combinations of two or more thereof.

18. A process according to claim 17 wherein said carbonyl compound is terephthalic acid or ester thereof and said alcohol is ethylene glycol.

19. A process according to claim 18 wherein said toner is cobalt aluminate; cobalt acetate; anthranquinones anthrapyridones; Carbazole violet (CI pigment violet 23, diindolo[2,3-c:2'3'-n]triphenodioxazine, 9,19-dichloro-5,15-diethyl-5,15-dihydro-); Estofil Blue S-RLS®; Polysynthren Blue RLS (C.I. Solvent Blue 45); Polysynthren Blue R (C.I. Solvent Blue 122, acetamide, N-[4-[(9,10-dihydro-4-hydroxy-9,10-dioxo-1-anthracenyl)amino]phenyl]); Polysynthren Red GFP (C.I. Solvent Red 135, 12H-phthaloperin-12-one, 8,9,10,11-tetrachloro); Polysynthren Red BB (Solvent Red 195, 2-Thiophenecarboxylic acid, 4-cyano-5-((5-cyano-2,6-bis((3-methoxypropyl)amino)-4-methyl-3-pyridinyl)azo)-3-methyl-, methyl ester); C.I. Solvent Violet 49; Sandoplast Blue 2B (C.I. Solvent Blue 104. 9,10-anthrecenedione, 1,4-bis(2,4,6-trimethylphenyl)amino); Sandoplast RBS-FP; CuPc Blue; C.I. Pigment Red 263; C.I. Pigment Blue 29 (sodium alumino sulfosilicate); C.I. Pigment Violet 15; Holliday Pigments Ultramarine blue AR grade; 3 micron particles; Holliday Pigments Ultramarine blue DRM grade; 2 micron particles; and Holliday Pigments Ultramarine blue DRFX grade; or combinations of two or more wherein C.I. is color index.

20. A process according to claim 1 wherein said carbonyl compound has the formula of $R^2COOR^2$; and one or more $R^2$ is a hydrocarbyl radical, said radical having about 3 to about 15 carbon atoms per radical.

* * * * *